(12) United States Patent
Helmling et al.

(10) Patent No.: US 12,227,124 B2
(45) Date of Patent: Feb. 18, 2025

(54) METHOD FOR OPERATING A LIGHTING DEVICE OF A MOTOR VEHICLE

(71) Applicant: Daimler Truck AG, Leinfelden-Echterdingen (DE)

(72) Inventors: Annette Helmling, Dornstadt (DE); Norbert Helmling, Bollingen (DE); Holger Hoechsmann, Holzheim (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 0 days.

(21) Appl. No.: 18/261,970

(22) PCT Filed: Nov. 16, 2021

(86) PCT No.: PCT/EP2021/081859
§ 371 (c)(1),
(2) Date: Jul. 18, 2023

(87) PCT Pub. No.: WO2022/156934
PCT Pub. Date: Jul. 28, 2022

(65) Prior Publication Data
US 2024/0075868 A1 Mar. 7, 2024

(30) Foreign Application Priority Data
Jan. 19, 2021 (DE) .................. 10 2021 000 226.1

(51) Int. Cl.
*B60Q 1/12* (2006.01)
*B60Q 1/20* (2006.01)

(52) U.S. Cl.
CPC ............. *B60Q 1/12* (2013.01); *B60Q 1/20* (2013.01); *B60Q 2300/122* (2013.01); *B60Q 2300/322* (2013.01)

(58) Field of Classification Search
CPC ...... B60Q 1/12; B60Q 1/20; B60Q 2300/122; B60Q 2300/322
(Continued)

(56) References Cited

U.S. PATENT DOCUMENTS 6,176,590 B1 * 1/2001 Prevost ................ B60Q 1/18
315/81
6,481,876 B2 * 11/2002 Hayami ................ B60Q 1/18
362/465
(Continued)

FOREIGN PATENT DOCUMENTS

DE 37 04 029 A1 8/1988
DE 103 06 108 A1 9/2004
(Continued)

OTHER PUBLICATIONS

PCT/EP2021/081859, International Search Report dated Mar. 17, 2022 (Two (2) pages).
(Continued)

*Primary Examiner* — Laura K Tso
(74) *Attorney, Agent, or Firm* — Crowell & Moring LLP

(57) ABSTRACT

A method for operating a lighting device of a motor vehicle where a front left outer region and a front right outer region of the motor vehicle can be lit with the lighting device. The method includes lighting the front left outer region and additionally the front right outer region when the motor vehicle is traversing a bend to the left and/or lighting the front right outer region and additionally the front left outer region when the motor vehicle is traversing a bend to the right.

10 Claims, 2 Drawing Sheets

(58) Field of Classification Search
USPC .......................................................... 362/543
See application file for complete search history.

(56) References Cited

U.S. PATENT DOCUMENTS

| | | | |
|---|---|---|---|
| 7,390,112 B2* | 6/2008 | Leleve | B60Q 1/18 |
| | | | 362/466 |
| 2001/0012206 A1 | 8/2001 | Hayami et al. | |
| 2013/0311049 A1* | 11/2013 | Lee | B60Q 1/12 |
| | | | 701/49 |

FOREIGN PATENT DOCUMENTS

| | | |
|---|---|---|
| DE | 10 2011 100 030 A1 | 10/2012 |
| EP | 0 864 462 A1 | 9/1998 |
| EP | 1 462 309 A2 | 9/2004 |
| JP | 2014-4882 A | 1/2014 |

OTHER PUBLICATIONS

German Search Report issued in German application No. 10 2021 000 226.1 dated Oct. 18, 2021, with Statement of Relevancy (Five (5) pages).

* cited by examiner

METHOD FOR OPERATING A LIGHTING DEVICE OF A MOTOR VEHICLE

BACKGROUND AND SUMMARY OF THE INVENTION

The present invention relates to a method for operating a lighting device of a motor vehicle, wherein the motor vehicle additionally has a steering device for steering the motor vehicle. The invention further relates to a motor vehicle operated in such a manner.

It is known to light a side of a motor vehicle on the inside of a bend when the motor vehicle is traversing a bend, in particular to increase the overview for a motor vehicle driver when traversing the bend. Obstacles when traversing the bend should in particular thus be recognized more easily and the danger of collisions should for example be reduced.

A corresponding motor vehicle is for example known from DE 10 2011 100 030 A1. The motor vehicle has a lighting device having a left bend light and a right bend light, wherein the right bend light is activated if the motor vehicle is traversing a bend to the left, and wherein the right bend light is activated when the motor vehicle is traversing a bend to the right. Analogously, the left bend light is activated if the motor vehicle is traversing a bend to the left. The right bend light is activated if the steering angle exceeds a right steering angle associated with the traversal of a bend to the right. Analogously, the left bend light is activated if the steering device exceeds a left bend angle associated with the traversal of the bend to the left.

The present invention is concerned with the object of providing improved, or at least different embodiments for a method for operating a lighting device of the kind previously specified and for an associated motor vehicle, which are characterized in particular by increased comfort and/or increased safety.

The present invention is based on the general idea of lighting not only the inside of the bend, but also the outside of the bend when a motor vehicle is traversing a bend. An improved overview over the motor vehicle is thus enabled for a motor vehicle driver. This makes use of the surprising fact that when traversing a bend, in particular in the case of sharp bends and/or cramped surroundings, objects and obstacles along the trajectory of the motor vehicle can be present not only on the inside of the bend, but also on the outside of the bend. By lighting the outside of the bend, it is thus possible to also recognize such obstacles and objects along the trajectory of the motor vehicle on the outside of the bend more easily. Comfort for a motor vehicle driver is thus correspondingly increased. In this way, it is further possible to prevent collisions with the objects or to reduce the danger of such collisions so that safety is simultaneously increased.

Corresponding to the inventive concept, the motor vehicle has a lighting device for lighting the outer region of the motor vehicle and a steering device for steering the motor vehicle. When traversing a bend, both the outer region of the motor vehicle on the outside of the bend and the outer region of the motor vehicle on the inside of the bend are lit. This means that when traversing a bend to the left, a front left outer region of the motor vehicle is lit as an outer region on the inside of the bend. When traversing a bend to the right, a front right outer region of the motor vehicle is additionally lit as an outer region on the inside of the bend. According to the invention, when traversing a bend to the left, the front right outer region is additionally lit, and/or when traversing a bend to the right, the front left outer region is additionally lit.

The presently specified directions advantageously relate to a motor vehicle coordinate system. This means that "front" is the direction in which the motor vehicle drives when driving forward in the x direction. Analogously, "left" and "right" are given in the y direction of the motor vehicle coordinate system.

Those embodiments are preferred in which the outer region of the motor vehicle on the outside of the bend is only lit if the motor vehicle is traversing a sharp bend. This means that lighting the outer region on the inside of the bend and the outer region on the outside of the bend occurs in stages, wherein the outer region on the inside of the bend is lit first and the outer region on the outside of the bend is additionally lit when traversing a sharp bend. This advantageously occurs by the front left outer region, and thus the outer region on the inside of the bend being lit if a first steering angle associated with the traversal of the bend to the left is exceeded. The front right outer region is only lit when traversing a bend to the left if a second left steering angle exceeding the first left steering angle is exceeded. As an alternative or in addition, when traversing a bend to the right, the front right outer region and thus the outer region on the inside of the bend is lit if a first right steering angle associated with the traversal of the bend to the right is exceeded, wherein the front left outer region is additionally lit when traversing a bend to the right if a second right steering angle exceeding the first right steering angle is exceeded. The respective steering angle here conveniently corresponds to the curve of the associated bend traversal, wherein the second steering angle means a sharper bend traversal. In this way, the respective outer region on the outside of the bend is only lit when needed. In this way, possible distractions of the motor vehicle driver are additionally reduced by lighting the outer region on the outside of the bend, and safety is thus further improved.

The respective second steering angle can in principle be selected such that it is any angle so long as it exceeds the associated first steering angle.

Those embodiments are preferred in which at least one of the second steering angles is defined and thus selected offset towards an associated steering end stop in comparison with the associated first steering angle. The respective steering end stop here defines the maximum possible curve in the trajectory of the motor vehicle in the associated bend traversal. In this way, in particular in the case of sharp bend traversals, the outer region of the motor vehicle on the outside of the bend is lit. This uses the knowledge that obstacles and objects along the trajectory of the motor vehicle substantially occur in the region on the outside of a bend in the case of sharp bend traversals near to the maximum possible curve of the bend being driven, and thus lying near to the steering end stop. In this way, the outer region on the outside of the bend is only lit when required. As a consequence, distractions of the motor vehicle driver are also reduced. As a whole, improved comfort is achieved simultaneously with improved safety.

It is preferred if the outer region on the outside of the bend is not lit on reaching the steering stop, but near to the steering end stop. In other words, the second steering angle may be defined offset to the associated steering end stop, but is spaced apart from the steering end stop.

Naturally, in addition to the method according to the invention, a motor vehicle so operated belongs to the scope of this invention.

The motor vehicle here comprises the steering device for steering the motor vehicle in addition to the lighting device for lighting the outer region of the motor vehicle. The lighting device preferably has a left bend lighting headlight and a right bend lighting headlight, wherein the respective bend lighting headlight lights the associated outer region of the motor vehicle in the associated bend lighting operation. This means that the left bend lighting headlight lights the front left outer region of the motor vehicle in the associated bend lighting operation and the right bend lighting headlight lights the front right outer region of the motor vehicle in the associated bend lighting operation. To operate the lighting device, the motor vehicle has a control device connected such that it communicates with the steering device and the lighting device, and designed such that it correspondingly operates the motor vehicle.

The respective bend lighting headlight can in principle be designed in any manner.

At least one of the bend lighting headlights can be a static bend light. This means that at least one of the bend lighting headlights is designed as a static bend light. In this way, the lighting device can be implemented in a simple and cost-efficient manner.

It is advantageously provided that at least one of the bend lighting headlights, in particular the static bend lighting headlight is designed as a fog lamp. In this way, the lighting device can be implemented in a particularly cost-efficient and simple manner.

It is also conceivable that at least one of the bend lighting headlights is designed as a dynamic bend light that can thus dynamically light the associated outer region.

The method according to the invention is in particular used in larger vehicles. This takes into account that obstacles and/or objects along the trajectory on the side on the outside of the bend occur in particular in the case of such vehicles having correspondingly larger dimensions. The motor vehicle is correspondingly a bus, for example. The motor vehicle can also be a heavy goods vehicle.

Further important features and advantages of the invention result from the dependent claims, from the drawings and from the associated description of figures with reference to the drawings.

Of course, the features previously specified and still to be explained in the following can be used not only in the respectively specified combination and also in other combinations or in isolation without moving beyond the scope of the present invention.

Preferred exemplary embodiments of the invention are depicted in the drawings and are explained in more detail in the following description, wherein identical reference numerals relate to identical or same or functionally identical components.

DETAILED DESCRIPTION OF THE DRAWINGS

Figure 1:
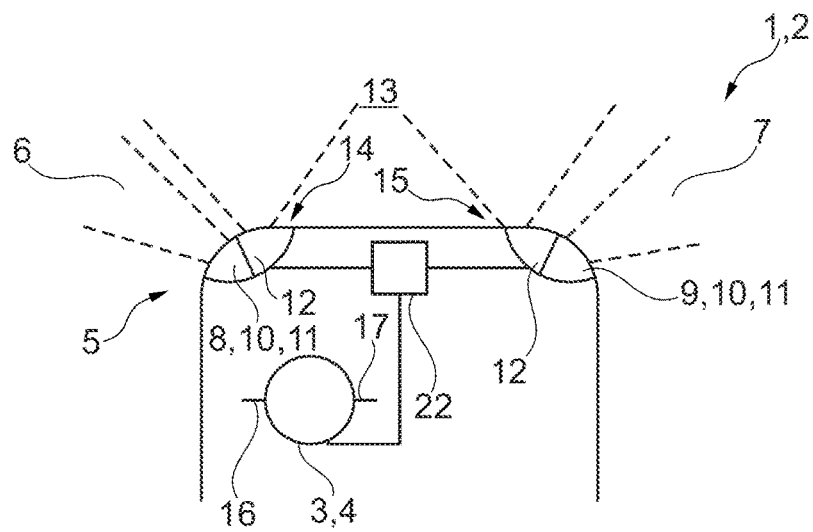
FIGS. 1 to 5 respectively schematically show a significantly simplified depiction of a motor vehicle as per a circuit diagram in different states.

A motor vehicle 1, as is shown for example in FIGS. 1 to 5, can in particular be designed as a bus 2. The motor vehicle 1 comprises a steering device 3 for steering the motor vehicle 1. The steering device 3 is depicted in a purely exemplary form in FIGS. 1 to 5 and is depicted as a steering wheel 4 for the sake of simplicity. The motor vehicle 1 further comprises a lighting device 5. The lighting device 5 in particular serves the purpose of lighting a side of the motor vehicle 1 on the inside of a bend when the motor vehicle 1 is traversing the bend. The lighting device 5 is thus designed such that it lights a front left outer region 6 when traversing a bend to the left and a front right outer region 7 of the motor vehicle 1 when traversing a bend to the right. The outer regions 6, 7 are respectively indicated in the figures by an associated cone, wherein cones depicted with a dashed line mean that the corresponding outer region 6, 7 is not lit, while outer regions 6, 7 depicted with solid lines show that the corresponding outer region 6, 7 is lit.

As can be understood from the figures, the lighting device 5 can respectively have an associated bend lighting headlight 8, 9 to light the front left outer region 6 and the front right outer region 7. The lighting device 5 thus has a left bend lighting headlight 8 to light the front left outer region 6 and a right bend lighting headlight 9 to light the front right outer region 7. At least one of the bend lighting headlights 8, 9 can be a static bend light 10, in particular a fog lamp 11.

As can be understood from the figures, the lighting device 5 advantageously additionally has headlights 12 for lighting a front outer region 13 of the motor vehicle 1, wherein these headlights 12 are also described as front headlights 12 in the following. As can further be understood from the figures, a bend lighting headlight 8, 9 and a front headlight 12 can respectively be integrated into a headlight device 14, 15 of the lighting device 5 together. The lighting device 5 can thus have a left headlight device 14 having the left bend lighting headlight 8 and a front headlight 12, and a right headlight device 15 having the right bend lighting headlight 9 of the other front headlight 12.

The steering device 13 is moved to steer the motor vehicle 1. This movement is achieved in particular manually, wherein it can also be achieved autonomously in the context of at least partially autonomous driving. To drive to the left and thus to traverse a bend to the left, the steering device 13 is advantageously moved to the left, and to drive to the right and thus to traverse a bend to the right, the steering device is preferably moved to the right. The maximum possible bend traversal is here defined respectively by a steering end stop 16, 17. This means that the maximum possible curve of the bend when traversing a bend to the left is defined by a left steering end stop 16 and the maximum possible curve when traversing a bend to the right is defined by a right steering end stop 17.

As can be understood from FIGS. 2 to 5, it is provided that during a respective bend traversal, not only the outer region 6, 7 of the motor vehicle 1 on the inside of the bend is lit, but also the outer region 6, 7 on the outside of the bend.

Figure 2:
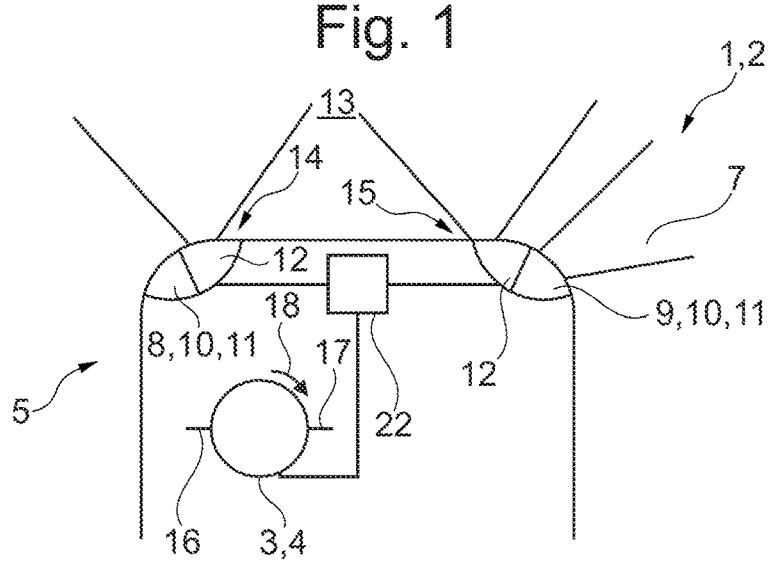

Corresponding to FIGS. 2 and 3, it is provided that when steering the motor vehicle 1 to the right while exceeding a first steering angle 18 associated with the bend traversal to the right, also described as a first right steering angle 18 in the following, the front right outer region 7 of the motor vehicle 1 is lit. When traversing an extreme bend to the right, and if the steering angle is thus larger than the first right steering angle 18, the front left outer region 6 of the motor vehicle is thus additionally lit, as can be understood from FIG. 3. This means that when a second right steering angle 19 shown in FIG. 3 is exceeded, the second right steering angle exceeding the first right steering angle 18, the front left outer region 6 of the motor vehicle 1 is additionally lit.

Figure 4:
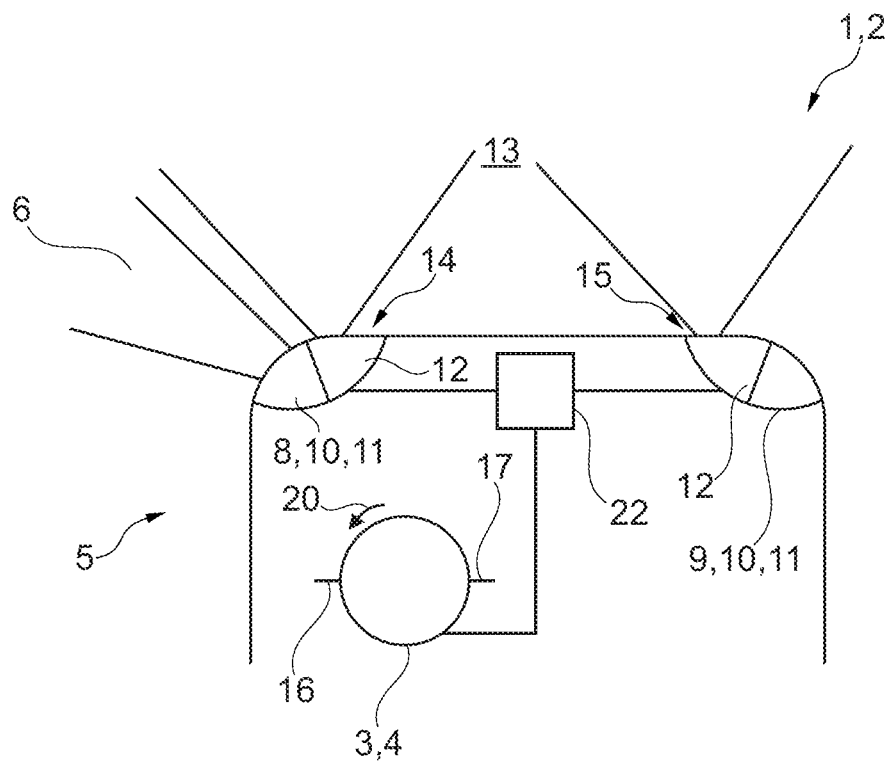
Figure 5:
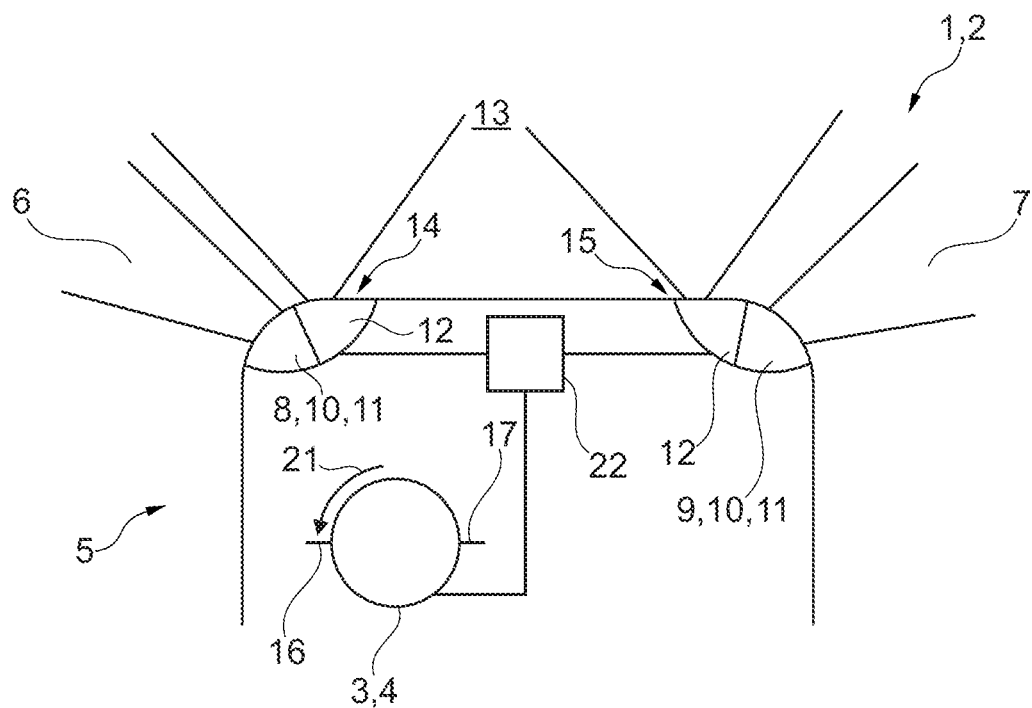

As can be understood from FIGS. 4 and 5, as an alternative or in addition, preferably in addition, it is possible to proceed correspondingly when traversing a bend to the left. This means, as can be understood from FIG. 4, that when a first left steering angle 20 is exceeded, the front left outer region 6 of the motor vehicle 1 is lit. When a second left steering angle 21 that exceeds the first left steering angle 20 is exceeded, the front right outer region 7 of the motor vehicle 1 is additionally lit, as can be understood from FIG. 5.

Figure 3:
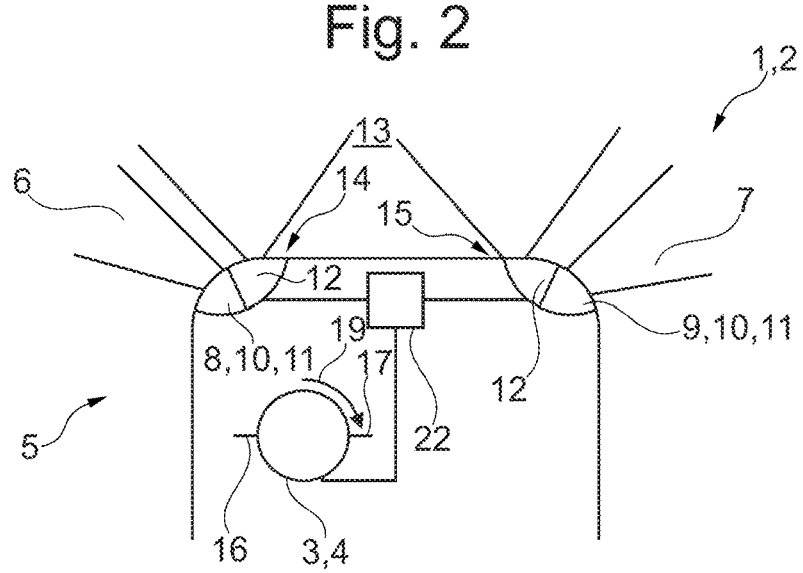

As can in particular be understood from FIGS. 3 and 5, the respective second steering angle 19, 21 can be selected or defined offset to the associated steering end stop 16, 17. The respective second steering angle 19, 21 is selected and defined near to the associated steering end stop 16, 17. In other words, the second right steering angle 19 is defined near to the second right steering end stop 17. The second left steering angle 21 is additionally defined near to the left steering end stop 16. This leads to the respective outer region 6, 7 on the outside of the bend near the end stop 16, 17 being lit.

The motor vehicle 1 has a control device 22 for carrying out the method. The control device 22 is here connected such that it communicates with the steering device 3 and the lighting device 5 and is designed to carry out the method. As can be understood from FIGS. 2 to 5, it is assumed in these figures purely as an example that the front headlights 12 are activated, and thus light the front region 13.

The invention is particularly advantageous when maneuvering and when reversing, in particular with buses. Thus, even when reversing with front wheels turned in the forward direction to the left, additionally or only the right side of the bend light is controlled and activated. The left bend light is activated with front wheels turned in the forward direction to the right. In particular in the case of buses with a large front overhang over the front wheels, this front overhang pivots noticeably outwards when reversing and the danger of collision with unrecognized obstacles in the pivot region is great.

The invention claimed is:

1. A method for operating a lighting device (5) of a motor vehicle (1), wherein a front left outer region (6) and a front right outer region (7) of the motor vehicle (1) can be lit with the lighting device (5), comprising the steps of:
    lighting the front left outer region (6) and additionally the front right outer region (7) when the motor vehicle (1) is traversing a bend to the left; and/or
    lighting the front right outer region (7) and additionally the front left outer region (6) when the motor vehicle (1) is traversing a bend to the right;
    wherein the front left outer region (6) is lit when traversing the bend to the left when a first left steering angle (20) associated with the traversing of the bend to the left is exceeded and wherein when traversing the bend to the left the front right outer region (7) is lit when a second left steering angle (21) exceeding the first left steering angle (20) is exceeded.

2. The method according to claim 1, wherein the front right outer region (7) is lit when traversing the bend to the right when a first right steering angle (18) associated with the traversing of the bend to the right is exceeded and wherein when traversing the bend to the right the front left outer region (6) is lit if a second right steering angle (19) exceeding the first right steering angle (18) is exceeded.

3. The method according to claim 2, wherein the second right steering angle (19) is defined offset towards a right steering end stop (17) in comparison with the first right steering angle (18) and wherein the second left steering angle (21) is defined offset towards a left steering end stop (16) in comparison with the first left steering angle (20).

4. The method according to claim 2, wherein the second right steering angle (19) is defined spaced apart from a right steering end stop (17) and wherein the second left steering angle (21) is defined spaced apart from a left steering end stop (16).

5. The method according to claim 1 performed when driving the motor vehicle forward and wherein the motor vehicle is a bus.

6. A motor vehicle (1), comprising:
    a lighting device (5) for lighting an outer region of the motor vehicle (1);
    a steering device (3) for steering the motor vehicle;
    wherein the lighting device (5) has a left bend lighting headlight (8) that lights a front left outer region (6) of the motor vehicle (1);
    wherein the lighting device (5) has a right bend lighting headlight (9) that lights a front right outer region (7) of the motor vehicle (1); and
    a control device (22), wherein the control device (22) is communicatively connected to the lighting device (5) and the steering device (3) and wherein the control device (22) operates the lighting device (5) according to the method of claim 1.

7. The motor vehicle according to claim 6, wherein at least one of the left bend lighting headlight (8) and the right bend lighting headlight (9) is a static bend light (10).

8. The motor vehicle according to claim 6, wherein at least one of the left bend lighting headlight (8) and the right bend lighting headlight (9) is a fog lamp (11).

9. The motor vehicle according to claim 6, wherein at least one of the left bend lighting headlight (8) and the right bend lighting headlight (9) is a dynamic bend light.

10. The motor vehicle according to claim 6, wherein the motor vehicle (1) is a bus (2).

* * * * *